United States Patent
Bianco et al.

(10) Patent No.: US 11,407,098 B2
(45) Date of Patent: Aug. 9, 2022

(54) SMART PUSH BUTTON DEVICE UTILIZING MEMS SENSORS

(71) Applicants: STMICROELECTRONICS S.R.L., Agrate Brianza (IT); STMICROELECTRONICS, INC., Coppell, TX (US)

(72) Inventors: Marco Bianco, Cesano Boscone (IT); Lorenzo Bracco, Chivasso (IT); Mahesh Chowdhary, San Jose, CA (US); Roberto Mura, Milan (IT); Stefano Paolo Rivolta, Desio (IT); Federico Rizzardini, Settimo Milanese (IT)

(73) Assignees: STMICROELECTRONICS S.R.L., Agrate Brianza (IT); STMICROELECTRONICS, INC., Coppell, TX (US)

( * ) Notice: Subject to any disclaimer, the term of this patent is extended or adjusted under 35 U.S.C. 154(b) by 254 days.

(21) Appl. No.: 16/696,772

(22) Filed: Nov. 26, 2019

(65) Prior Publication Data
US 2021/0154820 A1  May 27, 2021

(51) Int. Cl.
*B25F 5/00* (2006.01)
*B23B 45/00* (2006.01)
*G01C 19/00* (2013.01)

(52) U.S. Cl.
CPC .............. *B25F 5/001* (2013.01); *B23B 45/00* (2013.01); *G01C 19/00* (2013.01)

(58) Field of Classification Search
USPC ............................................................ 173/1
See application file for complete search history.

(56) References Cited

U.S. PATENT DOCUMENTS

| | | | |
|---|---|---|---|
| 5,704,435 A | 1/1998 | Meyer et al. | |
| 9,160,261 B2 * | 10/2015 | Nishikimi | H01H 15/16 |
| 9,612,625 B2 | 4/2017 | Oliver et al. | |
| 9,707,043 B2 | 7/2017 | Bozung | |
| 10,054,444 B2 | 8/2018 | Czompo et al. | |
| 10,198,086 B2 | 2/2019 | Parazynski et al. | |
| 10,238,510 B2 | 3/2019 | van der Walt et al. | |
| 10,386,203 B1 | 8/2019 | Zheng | |
| 10,509,466 B1 | 12/2019 | Miller et al. | |
| 10,976,150 B2 | 4/2021 | Zancanato et al. | |
| 2005/0103135 A1 | 5/2005 | Forster et al. | |
| 2008/0255795 A1 | 10/2008 | Shkolnikov | |
| 2009/0259424 A1 | 10/2009 | Dutta et al. | |

(Continued)

FOREIGN PATENT DOCUMENTS

| | | |
|---|---|---|
| CN | 201493816 U | 6/2010 |
| CN | 101788850 A | 7/2010 |

(Continued)

*Primary Examiner* — Michelle Lopez
(74) *Attorney, Agent, or Firm* — Seed IP Law Group LLP (57) ABSTRACT

A device for generating a control signal based on the linear movement of a linear member is provided. The device includes a linear member, a rotatable member, a first inertial measurement unit (IMU) coupled to the rotatable member and a second IMU having a fixed position. The device also includes a processing circuit which uses sensing signals from the IMUS to determine an attitude of the first IMU referenced to the second IMU and generate a control signal based on the attitude.

20 Claims, 6 Drawing Sheets

(56) References Cited

U.S. PATENT DOCUMENTS

| | | | |
|---|---|---|---|
| 2012/0259578 A1 | 10/2012 | Bevilacqua et al. |
| 2013/0269961 A1 | 10/2013 | Lim et al. |
| 2015/0116362 A1 | 4/2015 | Aurongzeb et al. |
| 2015/0130725 A1 | 5/2015 | Knepper et al. |
| 2015/0177272 A1 | 6/2015 | Clark |
| 2016/0147266 A1 | 5/2016 | Chng et al. |
| 2017/0010657 A1 | 1/2017 | Schneider |
| 2017/0258532 A1 | 9/2017 | Shalayev et al. |
| 2017/0299388 A9 | 10/2017 | Karahan et al. |
| 2018/0340768 A1 | 11/2018 | Zancanato et al. |
| 2019/0009398 A1 | 1/2019 | Zhong et al. |
| 2019/0126456 A1 | 5/2019 | Abbott et al. |
| 2021/0207940 A1 | 7/2021 | Zancanato et al. |
| 2021/0348911 A1 | 11/2021 | Rizzardini et al. |

FOREIGN PATENT DOCUMENTS

| | | |
|---|---|---|
| CN | 103678184 A | 3/2014 |
| CN | 104461330 A | 3/2015 |
| CN | 105405692 A | 3/2016 |
| CN | 105424040 A | 3/2016 |
| CN | 205289837 U | 6/2016 |
| CN | 105983949 A | 10/2016 |
| CN | 106482734 A | 3/2017 |
| CN | 108762324 A | 11/2018 |
| EP | 0823720 A1 | 2/1998 |
| EP | 2151734 A2 | 2/2010 |
| EP | 2930467 A1 | 10/2015 |
| EP | 3065031 A1 | 9/2016 |
| JP | 2001113475 A | 4/2001 |
| JP | 2013066944 A | 4/2013 |
| WO | WO 2019150657 A1 | 8/2019 |
| WO | WO 2019/168735 A1 | 9/2019 |

\* cited by examiner

SMART PUSH BUTTON DEVICE UTILIZING MEMS SENSORS

BACKGROUND

Technical Field

The present disclosure relates to a device and method for generating a variable electrical signal based on an angle between inertial movement sensors.

Description of the Related Art

Tools such as drills, circular saws and grinders may use a push button control that converts a distance that a push button is depressed into an electrical control signal that sets the speed or torque of the tool. A potentiometer may be used to create the electrical control signal. Potentiometers, however, are subject to wear, dust intrusion and electrical shorts caused by metal filings getting into the potentiometer. Characteristics of the tool may change with time due to potentiometer wear. Power tool users who use a tool daily are very sensitive about responsiveness of the tool.

BRIEF SUMMARY

In various embodiments, the present disclosure provides devices and methods in which a "smart" push button is utilized to convert a linear motion into a rotational motion. The linear motion may be provided, for example, by a user of a power tool which includes the smart push button. Two or more motion sensors, such as first and second inertial measurement units, are utilized to control one or more operational parameters or features of the tool based on operation of the smart push button. More particularly, a first inertial measurement unit may rotate on a rotational member in response to the linear motion (e.g., in response to a user depressing the smart push button), while a second inertial measurement unit may have a fixed location, such as on or within a housing of the tool. An amount of rotation of the first inertial measurement unit with respect to the second inertial measurement unit may be used as proxy for, or otherwise may be representative of, the amount of depression of the smart button. Outputs of the first and second inertial measurement units may thus be processed and utilized to control one or more operational parameters of the tool, such as a speed of a motor, or the like.

A smart push button device may include a linear member, a rotatable member, and first and second inertial measurement units (IMU). The rotatable member is coupled to the linear member so that when the linear member moves, or is displaced, the rotatable member rotates proportional to the displacement of the linear member. The first IMU is coupled to the rotatable member such that the position of the first IMU varies in response to the rotation of the rotatable member. The first IMU is configured to generate a first sensing signal. The second IMU has a fixed position relative to the rotatable member. The second IMU is configured to generate a second sensing signal. The smart push button device also includes a first processing circuit, or circuitry, which is coupled to the first IMU and the second IMU receiving the first and second sensing signals. The processing circuit, while in operation, determines an attitude of the first inertial measurement unit IMU with respect to the second IMU based on the first and the second sensing signals, and generates a control signal based on the determined attitude of the first inertial measurement unit.

A tool utilizing a smart push button may include a linear member, and a rotatable member. The rotatable member may be coupled to the linear member, wherein a rotating movement of the rotatable member is determined by a linear displacement of the linear member. The tool may also include a first IMU and a second IMU. The first IMU is coupled to the rotatable member, having a position which varies in response to the rotation of the rotatable member. An attitude of the first inertial measurement unit with respect to the second inertial measurement unit determines an operational parameter of the tool.

A method of operation for the smart push button device may include translating a linear motion of a linear member to a rotating motion of a first inertial measurement unit, determining an attitude of the first inertial measurement unit with reference to a second inertial measurement unit by a first processing circuit using sensing signals from the first and second inertial measurement units, and controlling an operational parameter of a tool based on the determined attitude.

BRIEF DESCRIPTION OF THE SEVERAL VIEWS OF THE DRAWINGS

Reference will now be made, by way of example to the accompanying drawings. In the drawings, identical reference numbers identify similar elements or acts. In some drawings, however, different reference numbers may be used to indicate the same or similar elements. The sizes and relative positions of elements in the drawings are not necessarily drawn to scale. Some of these elements may be enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with chip processing have not been shown or described in detail to avoid unnecessarily obscuring descriptions of the embodiments.

Unless the context indicates otherwise, throughout the specification and claims which follow, the word "comprise" and variations thereof, such as, "comprises" and "comprising" are to be construed in an open, inclusive sense that is as "including, but not limited to." Further, the terms "first," "second," and similar indicators of the sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

In various embodiments, the present disclosure provides a smart push button device for variable intensity control of a motor utilizes inertial measurement units (IMU). The IMUS include microelectromechanical systems (MEMS) sensors such as accelerometers and gyroscopes. A linear displacement of a push button is translated into a rotational displacement of a MEMS sensor. A linear member is coupled to a rotatable member using a gear or other coupling method. A first IMU follows an orientation of the rotatable member. A second IMU is in a fixed position relative to the rotatable member. An attitude, or angle, of the first IMU with respect to the second IMU is calculated from accelerometer and gyroscope outputs of each IMU. The attitude, or angle, of the first IMU with respect to the second IMU is then converted to an electrical control signal, analog or digital, that may be used to drive a motor, or any other electrical feature, component, circuitry, or the like.

A linear push button or switch, instead of having a small number of finite states, e.g., "pressed" and "released," may provide information about the extent to which the linear push button is pressed, or displaced, in a continuous manner, such as from a rest position to a fully depressed position. The same type of mechanism for the linear push button may be generalized to other applications besides push buttons and switches, such as low-stroke dynamometers, dampers and mechanical suspensions. Manufacturers call for scalable solutions in terms of dimension and resolution, depending on the application. Thus, while the following description is generally provided with respect to a push button, it will be readily appreciated that embodiments of the present disclosure encompass any device (including, e.g., dynamometers, dampers, mechanical suspensions, or the like) in which linear motion may be translated into rotational motion, and in which two or more IMUs may be utilized to generate an output signal indicative of the linear motion as will be described in further detail herein.

The power tool industry relies on linear push buttons to consistently generate a control signal to drive the power tools as desired by the user. For example, a linear push button on an electric drill adjusts the speed or torque of a drill bit proportionally to the amount of distance the push button is pressed. A motion of the push button is transformed into a control signal, analog or digital, which is used as input to a motor with a rotor coupled to the drill bit.

Intrinsic benefits other than motor control are immediately available thanks to motion sensor usage, such as activity recognitions, fall detection and stationary condition detection. The motor may be disabled if unsafe operation is detected.

Figure 1:
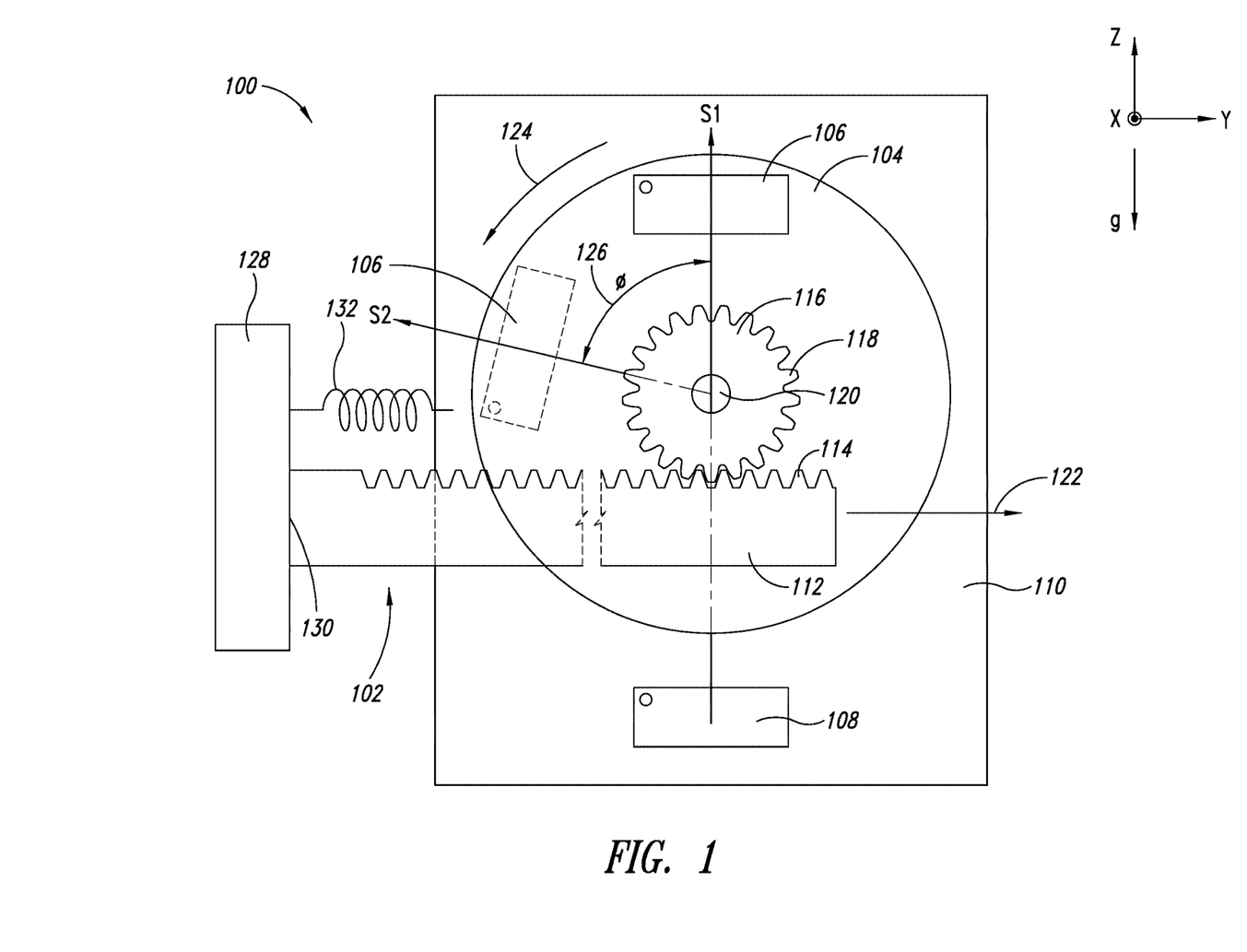
FIG. 1 is a front view schematically illustrating a mechanical assembly of a smart push button device, in accordance with one or more embodiments of the present disclosure.
Figure 2:
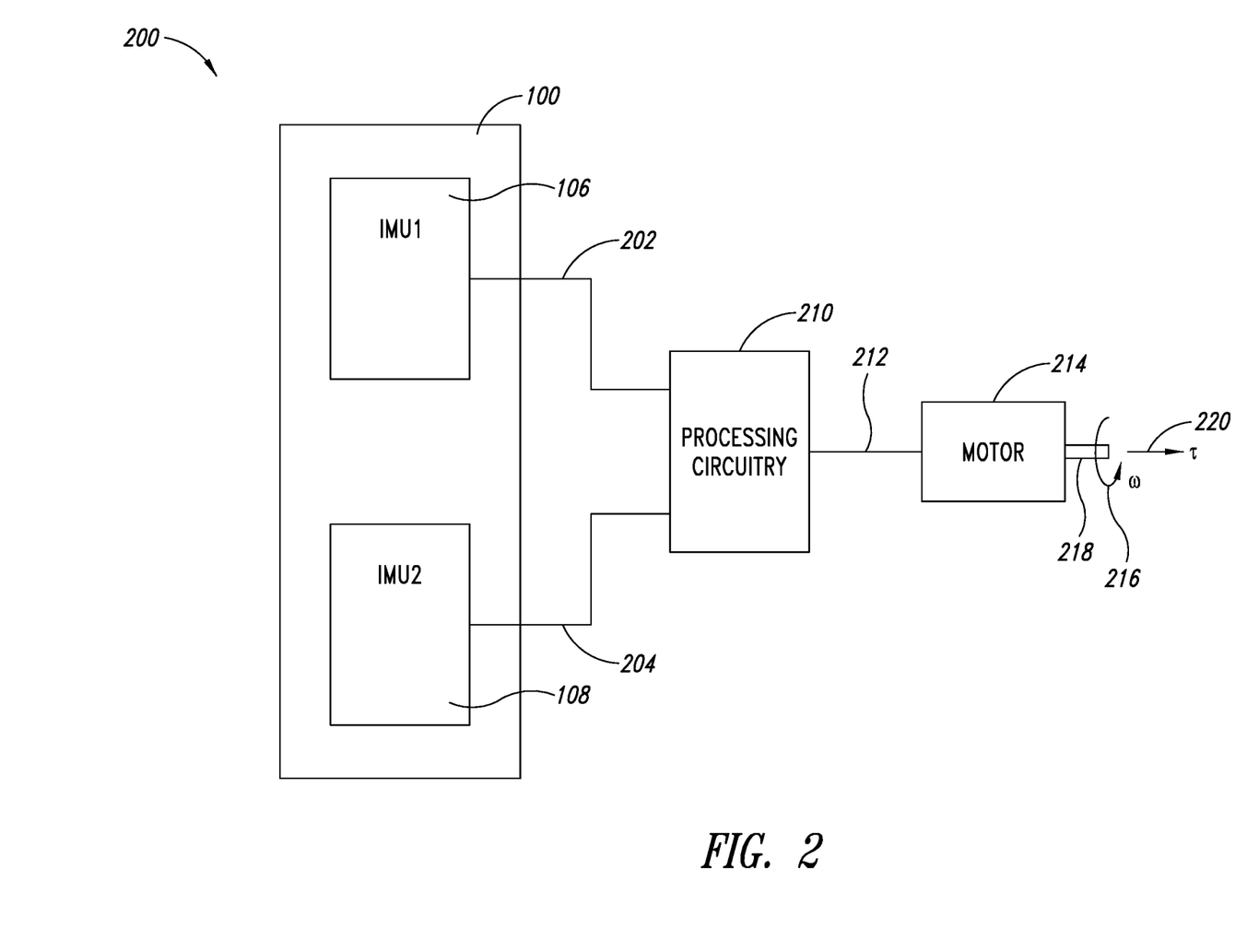
FIG. 2 is a block diagram illustrating a smart push button device, in accordance with one or more embodiments.

FIG. 1 is a front view schematically illustrating a mechanical assembly 100, which may be included in a smart push button device 200 (shown in FIG. 2). Mechanical assembly 100 includes a linear member 102, a rotatable member 104, a first inertial measurement unit (IMU) 106, a second inertial measurement unit 108 and a support frame 110. The first IMU 106 is coupled to the rotatable member 104 to follow an orientation of the rotatable member 104, e.g., the first IMU 106 may be attached to the rotatable member 104 so that the position of the first IMU 106 rotates in correspondence with rotation of the rotatable member 104. The second IMU 108 may be attached to the support frame 110 and fixed in position with respect to the support frame 110. The second IMU 108 may be considered as a reference IMU, and rotation of the first IMU 106 (e.g., in response to linear displacement of the linear member 102) may be determined with respect to the reference or second IMU 108. In some embodiments, the second IMU 108 may be utilized as a reference without being fixed in any particular position with respect to the support frame 110. For example, as will be described in further detail later herein, the second IMU 108 may be configured to rotate in a direction opposite to that of the first IMU 106.

To facilitate description of the smart push button 200, a tri-axial coordinate system having X, Y and Z axes is shown. A gravitational acceleration vector g is shown parallel to the axis Z.

The linear member 102 is movable along a linear or substantially linear axis (e.g., parallel to the axis Y as shown in FIG. 1). The rotatable member 104 is mechanically coupled to the linear member 102, and the rotatable member 104 is movable about a rotational axis (e.g., parallel to the axis X as shown in FIG. 1) in response to movement of the linear member 102 along the linear axis. In some embodiments, the linear member 102 includes an elongated shaft 112, or rack, having gear teeth 114 on a side of the elongated shaft 112. However, embodiments of the present disclosure are not limited thereto, and in various embodiments the linear member 102 may have any shape, size, or other features suitable to cause rotation of the rotatable member 104 in response to linear motion of the linear member 102.

A gear 116 is mechanically coupled to the rotatable member 104, for example, the gear 116 may be attached to a side of the rotatable member 104. In some embodiments, the gear 116 itself may be the rotatable member 104. The gear 116 and the rotatable member 104 may rotate about a common shaft 120, for example, in response to a linear motion of the linear member 102. The common shaft 120 may be mechanically coupled to the support frame 110. The linear member 102 may be mechanically coupled to the rotatable member 104 by any suitable mechanism that facilitates translation of linear motion of the linear member 102 into rotational motion of the rotatable member 104. In some embodiments, the linear member 102 may be coupled to the rotatable member 104 by meshing gear teeth 118 of gear 116 with the gear teeth 114 of the linear member 102. A linear displacement 122 of linear member 102 results in a rotational displacement 124 of the rotatable member 104 and the first inertial measurement unit 106. In some embodiments, the rotational displacement 124 of the rotatable member 104 may be proportional to the linear displacement 122 of the linear member 102. An attitude of the first IMU with respect to the second IMU may be used to determine an angle of rotation ϕ 126 between the first IMU 106 and the second IMU 108.

The mechanical assembly 100 may also include a push button 128 coupled to an end 130 of the linear member 102 to accommodate, for example, a user's finger. In some embodiments, the linear member 102 itself may be depressed or otherwise translated in a linear direction in response to one or more forces exerted on the linear member 102, and the push button 128 may be omitted. A compression spring 132 may be coupled between the push button 128 and the support frame 110 providing a restorative force to allow the linear member 102 to return to a resting position after the finger is removed from push button 128. Alternatively, user interfaces such as a lever, or a multi-dimensional joystick, may be coupled to linear member 102 and may be utilized to manipulate linear motion of the linear member 102. For example, for a multi-dimensional joystick coupled to the linear member 102, a linear displacement 122 of linear member 102 may be proportional to a displacement of the joystick along a single axis.

Referring now also to FIG. 2, the smart push button device 200 includes the mechanical assembly 100, processing circuitry 210 and a motor 214. While FIG. 2 illustrates only the first and second inertial measurement units 106, 108 in the mechanical assembly 100, it will be readily appreciated that other features of the mechanical assembly 100 may be included in various embodiments, for example, as illustrated in FIG. 1. An output, or first sensing signal 202 of the first IMU 106 and an output, or second sensing signal 204 of the second IMU 108 is coupled to the processing circuitry 210. Processing circuitry 210 uses the attitude of the first IMU 106 with respect to the second IMU 108 to determine the angle of rotation ϕ 126 between the first IMU 106 and the second IMU 108. Processing circuitry 210 generates a control signal 212 using the determined angle of rotation ϕ 126. The processing circuitry 210 may include memory, analog circuitry, digital circuitry, a processor, and a processing core. The control signal 212 is coupled to the motor 214, and the control signal 212 may be utilized to control an operational parameter or aspect of the motor 214. Examples of an operational aspect of the motor 214 include speed or angular velocity ω 216, and torque τ 220 of a motor shaft 218. Accordingly, the smart push button device 200 may control an operational aspect of the motor 214 based on the determined angle of rotation ϕ 126, which is representative of an amount of linear motion of the linear member 102 (caused, for example, by depression of the button 126 by a user). In some embodiments, the control signal modulates an electrical current, which may be utilized to control the operational aspect of the motor 214.

Figure 3:
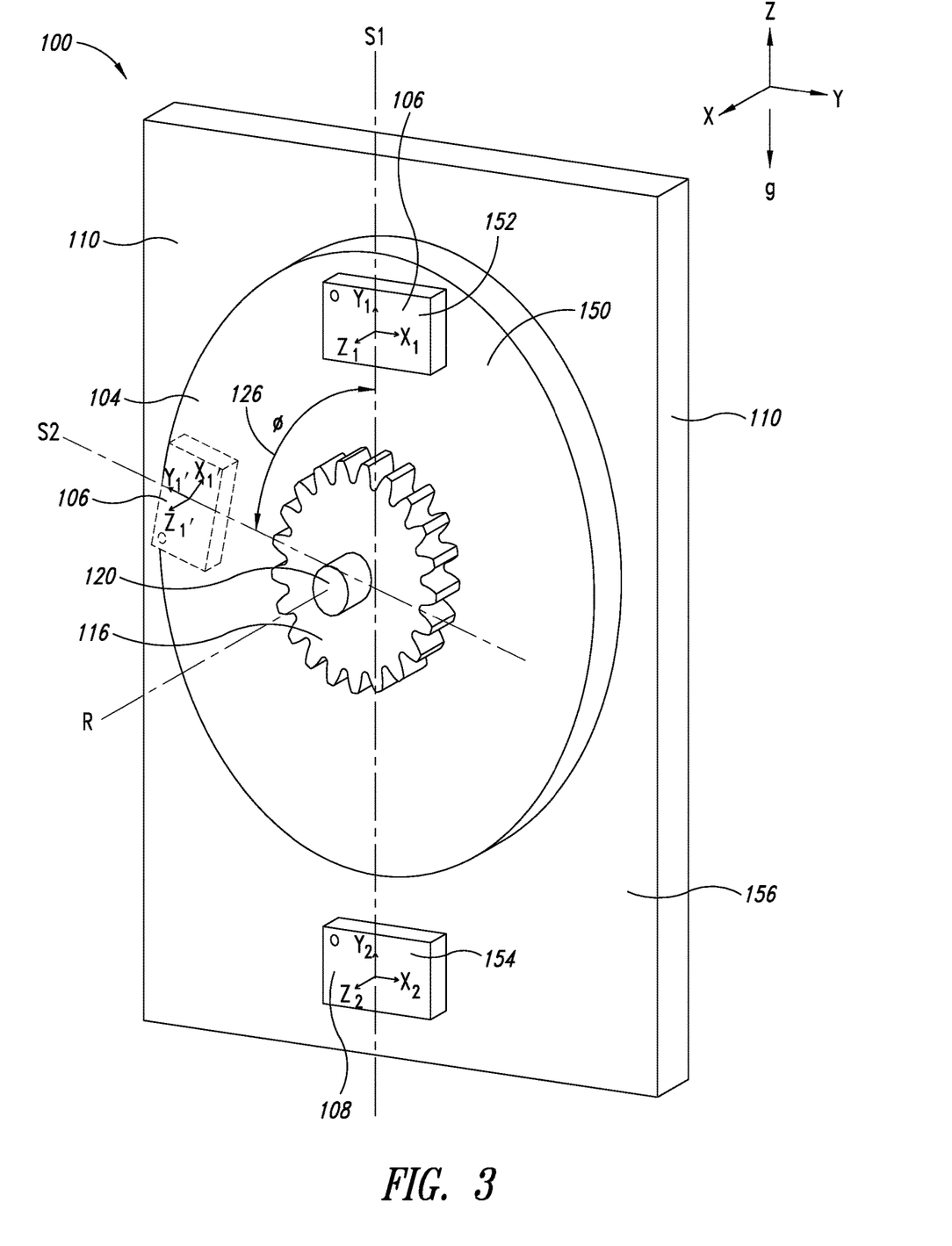
FIG. 3 is an isometric view illustrating components of the mechanical assembly of the smart push button device, in accordance with one or more embodiments.

Referring now to FIG. 3, the mechanical assembly 100 is shown in an isometric view corresponding to the front view of FIG. 1, having some elements of mechanical assembly 100 hidden for clarity. A surface 150 of the rotatable member 104 is parallel to the plane Y-Z. The rotatable member 104 and the support frame 110, are mechanically coupled to one another by any suitable technique or features. For example, the rotatable member 104 and the support frame 110 may be mechanically coupled by means of the shaft 120 allowing the rotatable member 104 to rotate with respect to the support frame 110, forming a rotational constraint about an axis R, which as pictured in FIG. 3 is parallel to the axis X. The shaft 120 and axis R are at right angles, or normal, to the axes Y and Z or plane Y-Z.

The first IMU 106 has detection axes $x_1$, $y_1$, $z_1$ which follow the orientation of the first IMU 106. The detection axis $z_1$ is shown normal to a surface 152 of IMU 106. The detection axes $x_1$ and $y_1$ are parallel to the surface 150 of rotatable member 104 (or 152 of IMU 106). The second IMU 108 is shown having detection axes $x_2$, $y_2$, $z_2$ which follow the orientation of the second IMU 108. The detection axis z2 is shown normal to a surface 154 of IMU 108, The second IMU 108 is mechanically fastened to the support frame such that a surface 154 of the second IMU 108 is parallel to the surface 150 of rotatable member 104 and thus parallel to the surface 152 of the first IMU 106. The attitude of the first IMU 106 with respect to the second IMU 108 utilizes the detection axes $x_1$, $y_1$, $z_1$ of the first IMU 106 relative to the detection axes $x_2$, $y_2$, $z_2$ of the second IMU 108.

The rotatable member 104 and the first IMU 106 are shown in two positions, position S1 and position S2 to facilitate discussion of operation of processing circuitry 210. While the detection axes $x_1$, $y_1$, $z_1$ retain the same orientation with reference to the first IMU 106, to an external observer the detection axes $x_1$, $y_1$, $z_1$ appear to change with rotation of the first IMU 106. The detection axes $x_{1'}$, $y_{1'}$, $z_{1'}$, shown are used to differentiate the detection axes orientation of the first IMU 106 in position S2 from the detection axes orientation of the first IMU 106 in position S1. Positions S1 and S2 will be used to describe operation of the processing circuitry 210 using the attitude of the first IMU 106 with respect to the second IMU 108 to determine the angle of rotation ϕ 126.

Figure 4:
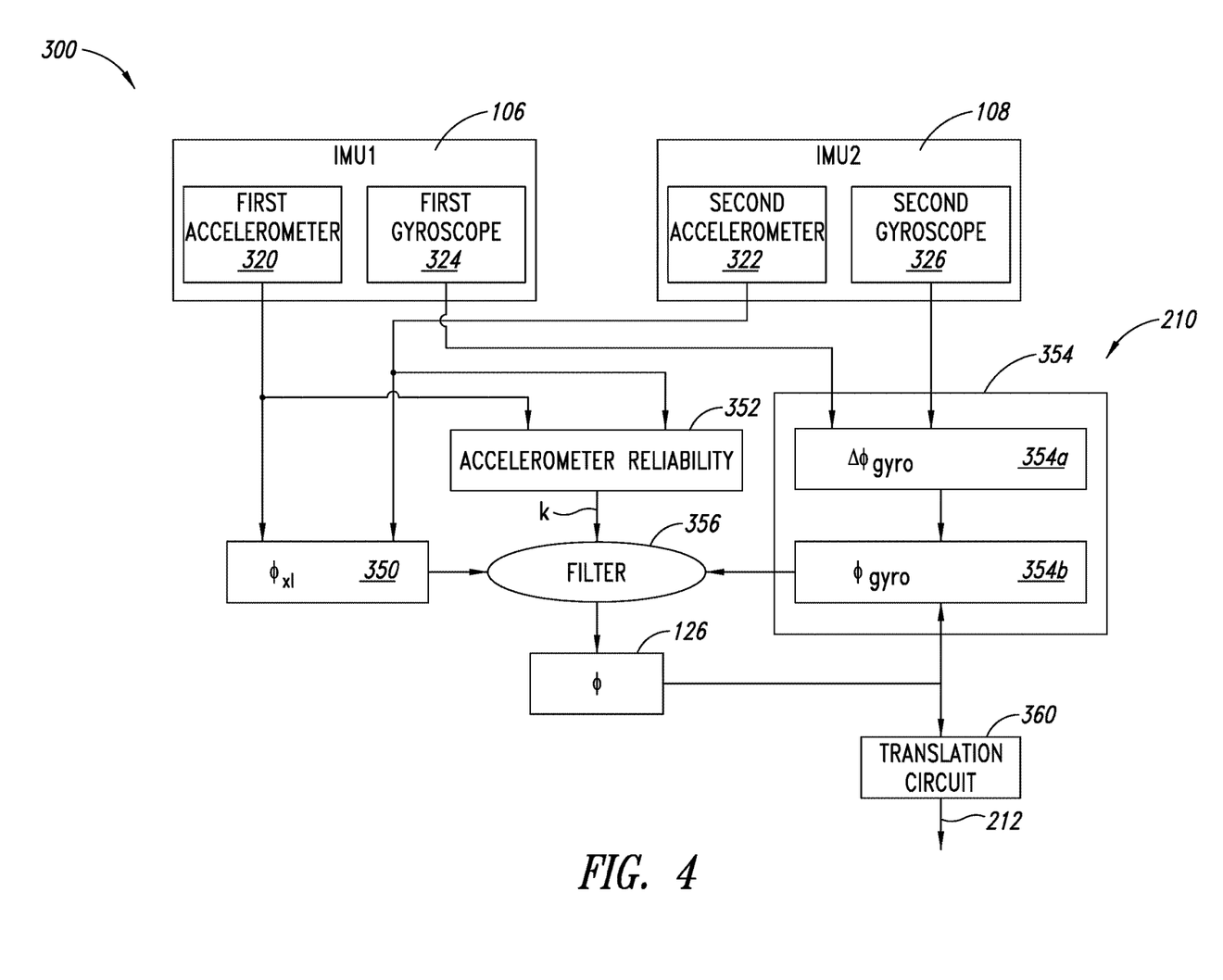
FIG. 4 is a functional block diagram of processing circuitry of the smart push button device, in accordance with one or more embodiments.

FIG. 4 is a functional block diagram 300 illustrating operation of the processing circuitry 210, in conjunction with the first and second IMUs 106 and 108. The first IMU 106 includes a first accelerometer 320, configured to sense first accelerations $Ax_1$, $Ay_1$, $Az_1$ along corresponding detection axes $x_1$, $y_1$, $z_1$ of the first IMU 106 as it rotates in correspondence with rotation of the rotatable member 104. The second IMU 108 includes a second accelerometer 322, configured to sense second accelerations $Ax_2$, $Ay_2$, $Az_2$ along corresponding detection axes $x_2$, $y_2$, $z_2$ of the second IMU 108 and consequently the support frame 110. In general, the first and the second accelerometers 320, 322 are adapted to detect a movement of the mechanical assembly 100 by measuring an acceleration. Additionally, the first accelerometer 320 of the first IMU 106 is adapted to detect movement (e.g., accelerations due to rotational movement) of the rotatable member 104 of the mechanical assembly 100, since the first IMU 106 is coupled to the rotatable member 104 and rotates in conjunction with rotation of the rotatable member 104. The first and second accelerometers 320, 322 may be, for example, MEMS accelerometers which are manufactured using MEMS technology.

The first IMU 106 also includes a first gyroscope 324 configured to sense first angular rotation rates $\omega_{x1}$, $\omega_{y1}$, $\omega_{z1}$ around corresponding detection axes $x_1$, $y_1$, $z_1$ as the first IMU 106 rotates in correspondence with rotation of the rotatable member 104. The second IMU also includes a second gyroscope 326, configured to sense second angular rotation rates $\omega_{x2}$, $\omega_{y2}$, $\omega_{z2}$ around corresponding detection axes $x_2$, $y_2$, $z_2$ as the second IMU 108 moves in correspondence with movement of the support frame 110.

The first sensing signal 202 (see FIG. 2) includes the first accelerations $Ax_1$ $Ay_1$ $Az_1$ and the first angular rotation rates $\omega_{x1}$, $\omega_{y1}$, $\omega_{z1}$ sensed and output by the first IMU 106. The second sensing signal 204 (see FIG. 2) includes the second accelerations $Ax_2$, $Ay_2$, $Az_2$ and the second angular rotation rates $\omega_{x2}$, $\omega_{y2}$, $\omega_{z2}$ sensed and output by the second IMU 108. While the first and second sensing signals 202, 204 are described for convenience as including both acceleration and angular rotation rate signals, it will be readily appreciated that in various embodiments, each of the first and second sensing signals 202, 204 may represent multiple signals output by the first and second IMUs 106, 108. For example, each of the first and second IMUs 106, 108 may output acceleration and angular rotation rate signals.

In an embodiment of processing circuitry 210, two methods of determining the angle of rotation ϕ 126 may be performed and the results weighted and filtered to increase a reliability of the resultant angle of rotation ϕ 126. A first method of determining the angle of rotation ϕ 126 may use acceleration, for example, based only on accelerations sensed by the first and second accelerometers 320, 322. A second method of determining the angle of rotation ϕ 126 may use angular rotation rates, for example, based only on angular rotation rates sensed by the first and second gyroscopes 324, 326.

Acceleration calculation block 350 receives the first accelerations $Ax_1$, $Ay_1$ and second accelerations $Ax_2$, $Ay_2$ to determine an angle of rotation calculated from acceleration $ϕ_{x1}$ according to the following formula:

$$ϕ_{x1}(\text{rad}) = \text{atan2}\left(\frac{Ax_1 Ay_2 - Ay_1 Ax_2}{Ax_1 Ax_2 - Ay_1 Ay_2}\right) + π$$

A reliability of the angle of rotation calculated from acceleration $ϕ_{x1}$ may be limited based on an orientation of mechanical assembly 100 with respect to the gravitational acceleration vector g. For the orientation shown in FIG. 3, the reliability is high. However, the closer the axis R is to being parallel to the gravitational acceleration vector g, the less reliable the rotation calculated from acceleration rotation $ϕ_{x1}$ becomes.

An accelerometer reliability block 352 accepts signals indicative of the first acceleration $Az_1$ and the second acceleration $Az_2$ to generate an acceleration reliability weight factor k, which may have a range from 0 to 1, with 1 representing, for example, a highest reliability. In an orientation of mechanical assembly 100 in which the axis R is perpendicular to the gravitational acceleration vector g, Az1 and Az2 are close to zero and the acceleration reliability weight factor k may be 1. In an orientation of mechanical assembly 100 in which the axis R is parallel to the gravitational acceleration vector g, the reliability weight factor k may be 0, which indicates a low reliability of the angle of rotation calculated by the acceleration calculation block 350.

A rate of rotation calculation block 354 includes a difference calculation block 354a (which may be referred to herein as a sub-block 354a) and an angle of rotation calculation block 354b (which may be referred to herein as a sub-block 354b). Sub-block 354a accepts signals indicative of the first angular rotation rate $ω_{z1}$ from the first IMU 106 and the second angular rotation rate $ω_{z2}$ from the second IMU 108 and determines a difference between the two angular rotation rates at a current time instant t as given by the following formula:

$$Δϕ_{gyro} = (ω_{z1} - ω_{z2}) dt$$

where dt is a sampling time of the gyroscope or the time between gyroscope readings at the just before the time instant t. The second sub-block 354b accepts the last value of the angle of rotation ϕ 126 and the value of the variation $Δϕ_{gyro}$ and calculates an angle of rotation $ϕ_{gyro}$ using the formula:

$$ϕ_{gyro}(t) = Δϕ_{gyro} + ϕ(t-1)$$

where ϕ(t-1) denotes the last value of the angle of rotation ϕ 126.

A filter block 356 accepts a value for $ϕ_{x1}$ from the acceleration calculation block 350, a value for acceleration reliability weighting factor k, from the accelerometer reliability block 352 and a value for $ϕ_{gyro}$ from sub-block 354b and fuses these values together to give an angle of rotation ϕ 126. The sub-block 354b thus generates the angle of rotation ϕ 126 as a weighted value in which the calculated acceleration $ϕ_{x1}$ and angle of rotation $ϕ_{gyro}$ are weighted based on the weighting factor k. In some embodiments, the filter block 356 implements a complementary filter using the following formula:

$$ϕ(t) = k*ϕ_{x1}(t) + (1-k)*ϕ_{gyro}(t)$$

where t is the current time.

A translation circuit 360 accepts the angle of rotation ϕ 126 and generates a control signal 212 based on the angle of rotation ϕ 126. A type of control signal 212 may be determined by the component being controlled, such as a motor 214. For example, the motor 214 may be a series wound direct current (DC) motor, in which case a fixed frequency, pulse width modulated control signal may be used. In another example, motor 214 may be a multi-phase permanent magnet motor for which a set of multi-phase, variable frequency control signals may be used. The translation circuit 360 not only generates the type of control signal 212, it determines a transfer function between the angle of rotation 126 and the control signal 212. For example, the smart push button 200 may be controlling a brightness of a light emitting diode (LED) light, which may utilize an exponential transfer function between the angle of rotation ϕ 126 and a pulse width modulated control signal 212. The exponential transfer function may be implemented using a lookup table, and may be calculated using a processor or may use analog circuitry. Other examples of transfer functions may include non-linear functions that respond to changes in the angle of rotation ϕ 126 or a rate of change of the angle of rotation ϕ 126. In some embodiments, the translation circuit 360, which may be included as part of the processing circuitry 210, may generate or output the control signal 212 by accessing values stored in a computer-readable memory, e.g., included in or otherwise accessible by the processing circuitry 210. For example, values of angle of rotation ϕ 126 may be stored in memory along with control signal outputs or values which correspond to the stored values of angle of rotation ϕ 126. In some embodiments, the translation circuit 360 may utilize the determined angle of rotation ϕ 126 to determine a corresponding control signal output that is associated with the determined angle of rotation ϕ 126 in a lookup table stored in the memory.

The positions S1 and S2 have been used for illustration. Other positions may be used during operation of the first IMU with respect to the second IMU. Other methods of determining an attitude of the first IMU with respect the second IMU may be used.

Each of the acceleration calculation block 350, accelerometer reliability block 352, rate of rotation calculation block 354, sub-block 354a, sub-block 354b, and filter block 356 may be implemented as electrical circuitry. In some embodiments, one or more of the acceleration calculation block 350, accelerometer reliability block 352, rate of rotation calculation block 354, sub-block 354a, sub-block 354b, and filter block 356 may be implemented at least in part as software that is loadable or executable by one or more hardware structures, such as a microcontroller unit (MCU), microprocessor, application processor, or the like.

Figure 5:
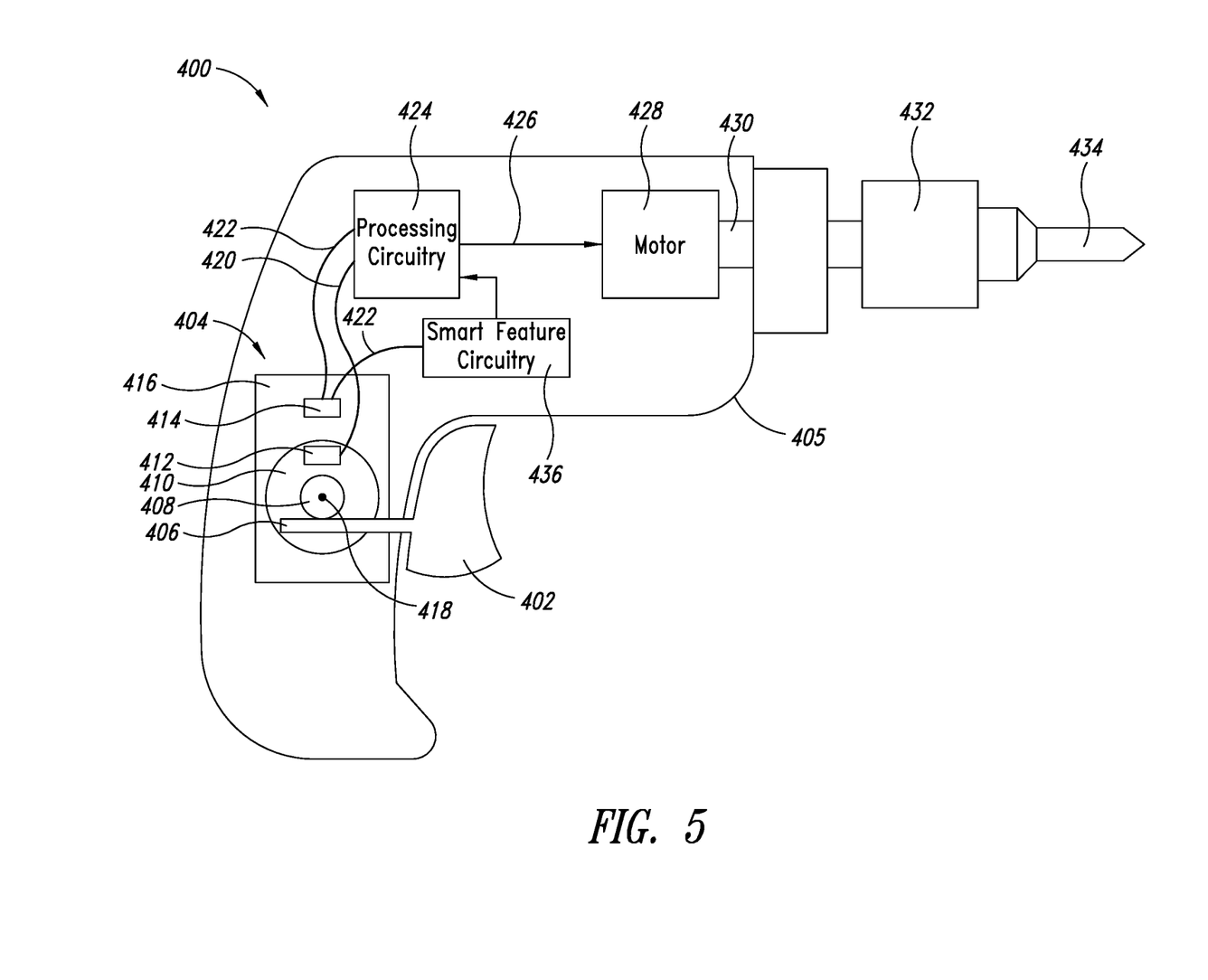
FIG. 5 is a block diagram of a tool utilizing the smart push button device, in accordance with one or more embodiments.

FIG. 5 is a schematic block diagram illustrating a power tool 400 in accordance with one or more embodiments of the present disclosure. The power tool 400 illustrated in FIG. 5 may be a drill, although embodiments are not limited thereto, and in various embodiments the power tool 400 may be any power tool having a user input element, such as a push button, trigger, or the like which may be moved linearly in response to user input to control an operation of the power tool 400.

As shown in FIG. 5, the power tool 400 includes a push button 402. The push button 402 is mechanically coupled to a mechanical assembly 404 by a linear member 406. The mechanical assembly 404 is mechanically coupled to a tool body 405 of the tool 400, such that the mechanical assembly 404 follows an orientation of the tool body 405. The mechanical assembly 404 may be the same as or substantially similar to the mechanical assembly 100 of FIG. 1, having a gear 408 coupled to linear member 405 and further coupled to a rotating member 410. A first IMU 412 is coupled to the rotating member 410 to follow an orientation of rotating member 410. A second IMU is mechanically coupled to a support frame 416, the support frame being mechanically coupled to the tool body 405. Rotatable member 410 is coupled to the support frame by a shaft 418 allowing rotatable member 410 to rotate with respect to the support frame 416. In operation, the first IMU 412 generates a first sensing signal 420 including an acceleration and a rate of rotation of the first IMU. In operation, the second IMU 414 representative of the acceleration and rate of rotation the second IMU 414 generates a second sensing signal 422, including an acceleration and rate of rotation of the second IMU 414. The power tool 400 also includes a processing circuit 424 which accepts the first and second sensing signals 420 and 422. The processing circuit uses the first and second sensing signals 420 and 422 to generate a control signal 426. The power tool 400 also includes a motor 428 having a motor shaft 430. The motor 428 may be a series wound electric motor having a rotation speed of the motor shaft 430 controlled by pulse width modulated control signal 426. The motor shaft 430 may be coupled to a bit chuck 432 and a drill bit 434.

The power tool 400 may also include smart feature circuitry 436, or a second processing circuitry, coupled to either the first or second IMU 412 or 414. An example of smart feature circuitry 436 is shown in FIG. 5 electrically coupled to the second IMU 414 by the second sensing signal 422. The smart feature circuitry 436 may use the second sensing signal 422 to determine a variety of conditions associated with the power tool 400 based on motion of the power tool 400 as sensed by at least one of the first or the second IMUs 412, 414. Such conditions may include, for example, a power tool orientation, power tool activity recognition, or unsafe power tool operation. Unsafe power tool operation may include excessive vibration or awkward operating positions. Other conditions may be determined based on the second sensing signal 422, such as determining that the power tool 400 is falling or that the power tool 400 is stationary. The smart feature circuitry 436 may interact with the processing circuitry 424. For example, a condition in which the power tool 400 is being transported, may be sensed by the smart feature circuitry 436 and operation of the power tool 400 may be inhibited during transport. For example, the processing circuitry 424 or the smart feature circuitry 436 may disable operation of the power tool 400 based on the determination that the power tool 400 is being transported or moved at a rate of motion which exceeds a selected threshold rate of motion. Conversely, the smart feature circuitry 436 may detect a stationary condition of the power tool 400 and provide the processing circuitry 424 with an enable input to enable the control signal 212.

Figure 6:
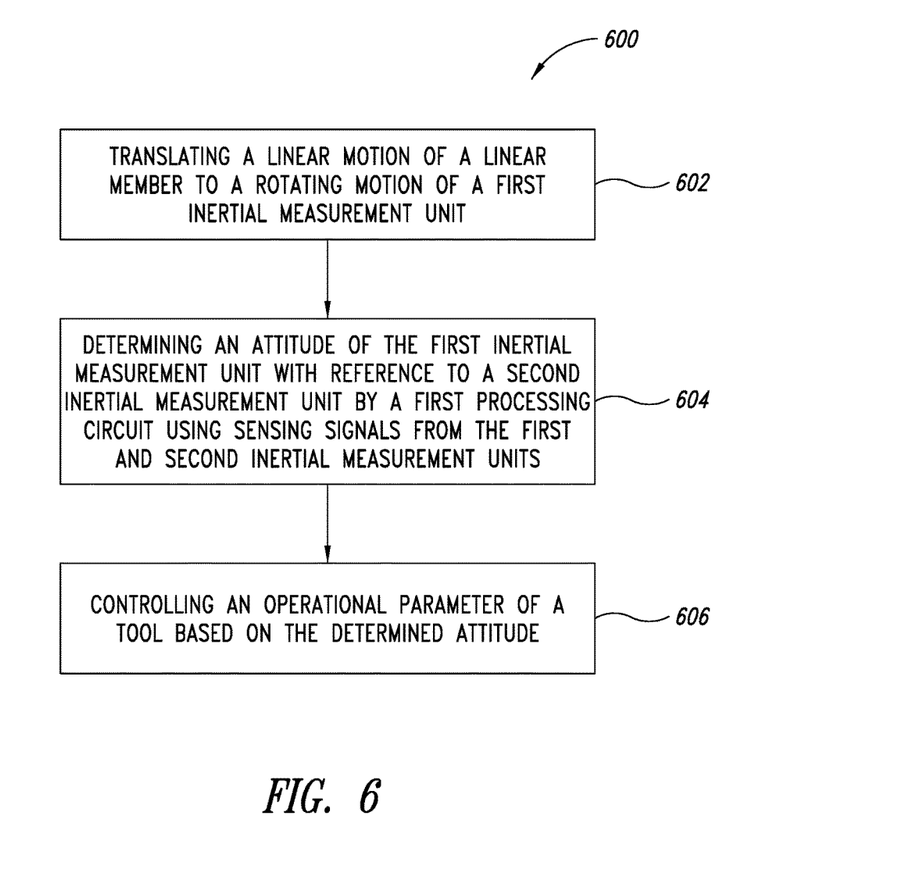
FIG. 6 is a flow chart illustrating a method of controlling an operational parameter of a tool having a smart push button, in accordance with one or more embodiments.

FIG. 6 is a flow-chart illustrating a method 600 of controlling an operational parameter of a tool having a smart push button device in accordance with one or more embodiments. At 602, a linear motion 122 of a linear member 102 is translated to a rotational motion 124 of a first IMU 106. For example, in some embodiments, linear motion 122 of the linear member 102 may be translated to a rotational motion 124 by a rotating member 104, and the first IMU 106 may be rotated by an angle of rotation ϕ 126.

At 604, an attitude of the first IMU 106 is determined with reference to the second IMU 108 using the processing circuit 210. Processing circuit 210 uses sensing signals from the first and second IMUs 106 and 108. The sensing signals may include, for example, accelerometer and gyroscope measurements from the first and second IMUs 106 and 108. An embodiment of a method for determining the attitude, for example the angle of rotation ϕ for the first IMU 106, was discussed previously with respect to FIG. 4.

At 606, an operational parameter of a tool is controlled based on the determined attitude, for example the angle of rotation ϕ 126. Examples of an operational parameter that is controlled at 606 include speed, torque, and position, which may be controlled, for example, by controlling a motor or motors, such as motor 214.

Other embodiments may be implemented in devices other than power tools. For example, embodiments of the present disclosure may include or otherwise be implemented in household appliances such as a blender, and automotive applications such as an electrical feedback of a linear motion of a part in an active suspension system. Additional embodiments may be used for control of industrial machines. A smart push button device may control, for example, a heat coil such as may be used for a soldering iron or a solenoid device having a force exerted proportional to the distance the smart push button is depressed.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   a linear member;
   a rotatable member coupled to the linear member, wherein the rotatable member rotates in response to a linear displacement of the linear member;
   a first inertial measurement unit coupled to the rotatable member and having a position which varies in response to rotation of the rotatable member, the first inertial measurement unit configured to generate a first sensing signal;
   a second inertial measurement unit having a fixed position relative to the rotatable member, the second inertial measurement unit configured to generate a second sensing signal; and
   a first processing circuit coupled to the first inertial measurement unit and the second inertial measurement unit, the first processing circuit configured to determine an attitude of the first inertial measurement unit with respect to the second inertial measurement unit based on the first and the second sensing signals, and to generate a control signal based on the determined attitude of the first inertial measurement unit.

2. The device of claim 1, wherein the control signal modulates an electrical current.

3. The device of claim 1, wherein the first processing circuit is configured to determine a falling condition of the device based on at least one of the first sensing signal or the second sensing signal.

4. The device of claim 1, the device further comprising:
a motor electrically coupled to the first processing circuit, wherein the control signal modulates at least one of a speed of the motor or a torque of the motor.

5. The device of claim 4, wherein the device is a drill, the drill including:
a push button coupled to the linear member; and
a chuck coupled to the motor;
wherein, in response to depression of the push button, a rotating speed of the chuck is increased.

6. The device of claim 1, wherein the first processing circuit is configured to access a computer-readable memory, and generate the control signal based on information stored in the computer-readable memory and associated with the determined attitude.

7. The device of claim 1, wherein the first processing circuit is configured to generate the control signal as a function of a rate of change of the attitude of the first inertial measurement unit with reference to the second inertial measurement unit.

8. The device of claim 1, the device further comprising:
a second processing circuit coupled to the second inertial measurement unit, the second processing circuit configured to determine an operating condition of the device based on the second sensing signal.

9. The device of claim 8, wherein the second processing circuit is coupled to the first processing circuit, the second processing circuit configured to enable the control signal when a safe operating condition is determined by the second processing circuit.

10. A tool, comprising:
a linear member;
a rotatable member coupled to the linear member, the rotatable member configured to rotate in response to a linear displacement of the linear member;
a first inertial measurement unit coupled to the rotatable member and having a position which varies in response to the rotation of the rotatable member;
a second inertial measurement unit; and
processing circuitry coupled to the first and second inertial measurement units, the processing circuitry configured to control an operational parameter of the tool based on an attitude of the first inertial measurement unit with respect to the second inertial measurement unit.

11. The tool of claim 10, wherein the second first inertial measurement unit has an orientation that follows an orientation of the rotatable member.

12. The tool of claim 10, wherein the second inertial measurement unit is mechanically coupled to the tool, and has an orientation that is fixed with respect to the tool.

13. The tool of claim 10, wherein the processing circuitry is configured to determine an operational condition of the tool based on a sensing signal output by the second inertial measurement unit.

14. The tool of claim 13, wherein the processing circuitry is configured to disable operation of the tool based on the determined operational condition of the tool.

15. The tool of claim 13, wherein the processing circuitry is configured to disable operation of the tool in response to the determined operational condition of the tool indicating that the tool is being transported.

16. A method, comprising:
translating a linear motion of a linear member to a rotating motion of a first inertial measurement unit;
determining, by a first processing circuit, an attitude of the first inertial measurement unit with reference to a second inertial measurement unit based on sensing signals received from the first and second inertial measurement units; and
controlling an operational parameter of a tool based on the determined attitude.

17. The method of claim 16, wherein the determining an attitude of the first inertial measurement unit with reference to the second inertial measurement unit:
determining a first attitude based on accelerometer outputs of the first and second inertial measurement units;
determining a first attitude reliability weight (k) based on the accelerometer outputs of the first and second inertial measurement units, where k is a value within a range from 0 to 1;
determining a second attitude of the first inertial measurement unit with reference to the second inertial measurement unit based on gyroscopic outputs of the first and second inertial measurement units;
determining a first weighted attitude by multiplying the first attitude by k;
determining a second weighted attitude by multiplying the second attitude by (1−k); and
determining the attitude of the first inertial measurement unit with reference to the second inertial measurement unit by adding the first weighted attitude and the second weighted attitude.

18. The method of claim 16, wherein the determining an attitude of the first inertial measurement unit with reference to the second inertial measurement using sensing signals from the first and second IMUs includes:
determining a first attitude using accelerometer measurements from the sensing signals from the first and second inertial measurement units;
determining a second attitude using gyroscope measurements from the sensing signals from the first and second inertial measurement units; and
filtering the first attitude and the second attitude to determine the attitude of the first inertial measurement unit with reference to the second inertial measurement unit.

19. The method of claim 16, further comprising:
determining, by a second processing circuit, a condition of the tool using the sensing signals from the second inertial measurement unit.

20. The method of claim 19, further including:
disabling operation of the tool when an unsafe condition is determined by the second processing circuit.

* * * * *

UNITED STATES PATENT AND TRADEMARK OFFICE
CERTIFICATE OF CORRECTION

PATENT NO. : 11,407,098 B2
APPLICATION NO. : 16/696772
DATED : August 9, 2022
INVENTOR(S) : Bianco et al.

Page 1 of 1

It is certified that error appears in the above-identified patent and that said Letters Patent is hereby corrected as shown below:

In the Claims

Column 11, Claim 11, Line 57:
"wherein the second first inertial" should read: --wherein the first inertial--.

Signed and Sealed this
Twentieth Day of September, 2022

Katherine Kelly Vidal
*Director of the United States Patent and Trademark Office*